US011888847B2

(12) United States Patent
Robinson-Morgan et al.

(10) Patent No.: US 11,888,847 B2
(45) Date of Patent: Jan. 30, 2024

(54) SYSTEMS AND METHODS FOR USE IN CONTEXT-BASED AUTHENTICATION

(71) Applicant: MASTERCARD INTERNATIONAL INCORPORATED, Purchase, NY (US)

(72) Inventors: Bryn Anthony Robinson-Morgan, Mosborough Village (GB); Liang Tian, Rye Brook, NY (US); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 357 days.

(21) Appl. No.: 17/480,967

(22) Filed: Sep. 21, 2021

(65) Prior Publication Data
US 2022/0109673 A1 Apr. 7, 2022

Related U.S. Application Data

(60) Provisional application No. 63/088,960, filed on Oct. 7, 2020.

(51) Int. Cl.
*H04L 29/06* (2006.01)
*H04L 9/40* (2022.01)

(52) U.S. Cl.
CPC ...... *H04L 63/0876* (2013.01); *H04L 63/0861* (2013.01); *H04L 63/102* (2013.01); *H04L 63/20* (2013.01)

(58) Field of Classification Search
CPC ............. H04L 63/0876; H04L 63/0861; H04L 63/102; H04L 63/20; H04L 63/083; H04W 12/60; H04W 12/069
See application file for complete search history.

(56) References Cited

U.S. PATENT DOCUMENTS

| 9,426,182 | B1* | 8/2016 | Zeljko | H04L 63/08 |
| 11,271,930 | B2* | 3/2022 | Piel | G06Q 20/40 |
| 2013/0232542 | A1 | 9/2013 | Cheng et al. | |
| 2016/0063229 | A1 | 3/2016 | Key et al. | |

(Continued)

FOREIGN PATENT DOCUMENTS

WO WO2016/043373 3/2016

*Primary Examiner* — Baotran N To
(74) *Attorney, Agent, or Firm* — Harness, Dickey & Pierce, P.L.C.

(57) ABSTRACT

Systems and methods are provided for context-based authentication, via a decentralized network. One example method includes receiving, at a mobile device, from a relying party, a request for an attribute of a user in connection with an interaction between the user and the relying party and determining a type of authentication to be used for the interaction, based on an authentication policy of the relying party and multiple context signals stored in the mobile device prior to providing the attribute to the relying party. The multiple context signals are indicative of one or more patterns indicative of the user and/or the mobile device. The method also includes soliciting authentication data from the user consistent with the determined type of authentication, receiving, by the mobile device, the solicited authentication from the user, and providing the attribute to the relying party in response to the user being authenticated at the mobile device.

20 Claims, 3 Drawing Sheets

(56) References Cited

U.S. PATENT DOCUMENTS

| | | |
|---|---|---|
| 2016/0132673 A1 | 5/2016 | Birk et al. |
| 2020/0007536 A1* | 1/2020 | Piel .................... G06Q 20/401 |
| 2022/0191198 A1* | 6/2022 | Piel .................... G06Q 20/401 |
| 2022/0224685 A1* | 7/2022 | Dhindsa ............. H04L 63/0853 |

* cited by examiner

SYSTEMS AND METHODS FOR USE IN CONTEXT-BASED AUTHENTICATION

CROSS-REFERENCE TO RELATED APPLICATION

This application claims the benefit of, and priority to, U.S. Provisional Application No. 63/088,960, filed Oct. 7, 2020. The entire disclosure of the above application is incorporated herein by reference.

FIELD

The present disclosure is generally directed to systems and methods for use in context-based authentication in a decentralized network.

BACKGROUND

This section provides background information related to the present disclosure which is not necessarily prior art.

Users are known to be associated with identities. The identities are generally specific to the users and often include their names, government-based identifiers (e.g., social security numbers, etc.), mailing addresses, phone numbers, email addresses, credit scores, etc. And, as part of certain interactions by the users with relying parties, the relying parties verify the identities of the users and then rely on the identities of the users in interactions with the users. Aspects of the identities of the users may further impact the manner by which the relying parties interact with the users (e.g., with regard to available terms, etc.), or whether the relying parties interact with the users at all (e.g., the relying parties may decline to offer services based on such aspects of the identities, etc.).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Relying parties often authenticate users, in connection with evaluating the users for different interactions and determining whether to further interact with the users. The authentication may be performed based on, for example, knowledge (e.g., passwords, etc.), possession (e.g., hardware tokens, mobile devices, etc.), or biometrics (e.g., fingerprints, facial images, etc.), or combinations thereof. Certain forms of authentication are more onerous, than others, and certain higher forms of authentication (or stronger forms, etc.) (i.e., providing relatively stronger confidence in the user being who he/she claims to be) may be required by relying parties, when less forms of authentication (or weaker forms, etc.) (i.e., providing relatively weaker confidence in the user being who he/she claims to be) may be sufficient. The form of authentication is often rigidly applied by the relying party regardless of the context in which the authentication is being requested. In this manner, different forms of authentication are required, statically, even when the context of the authentication may indicate otherwise (e.g., for repeat interactions, etc.), whereby context is conventionally disregarded.

Uniquely, the systems and methods herein provide for context-based authentication, whereby the context of interactions is considered in determining types of authentication to be employed for the interactions. In particular, context associated with users and/or the users' devices may be analyzed, in connection with the interactions, to provide context signals. Then, the context signals may be used, in combination with relying party policies related to authentication, to determine types of authentication suited to the particular interactions. The determined types of authentication may then be performed and, when successful, identity attributes associated with the users being authenticated may be provided to the relying parties. In this manner, the types of authentication are selected based at least in part on the context of the interactions (e.g., between the users and the relying parties, etc.), and also potentially on the relying party (rather than selecting a default type of authentication), to thereby avoid unnecessary use of stronger authentication, where weaker (and less onerous, etc.) authentication provides sufficient confidence given considerations of the context of the interactions. As such, the systems and methods herein may provide reduced communication with the user based on the context of the authentication being requested and, consequently, a reduction in the friction associated with the interaction and/or in network traffic associated with authentication of the user.

Figure 1:
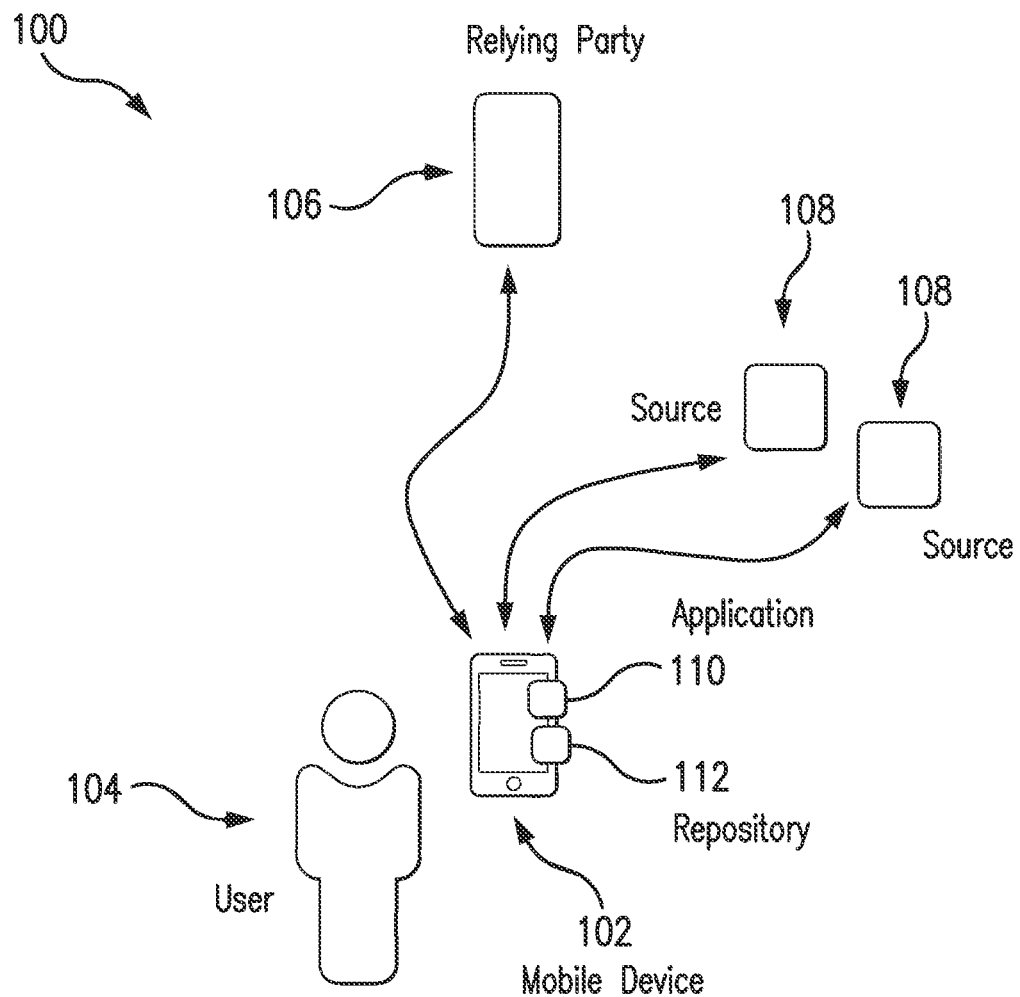
FIG. 1 is an example system of the present disclosure suitable for use in context-based authentication of users.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users and parties, numbers of relying parties, types of interactions between users and relying parties, data privacy requirements and/or regulations, etc.

The system 100 generally includes a mobile device 102 associated with a user 104, a relying party 106, and two sources (each indicated at reference number 108), each of which is coupled in communication via one or more networks (e.g., as indicted by the arrowed lines, etc.). The one or more networks may each include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The mobile device 102 may include any suitable device, which is generally mobile with the user 104 as the user 104 moves from location to location (but this mobility is not required in all embodiments). In this example embodiment, the mobile device 102 is illustrated as a smartphone. However, the mobile device 102 may be a different device (e.g., a different communication device, a different computing device, etc.) in other embodiments, including, for example, a laptop computing device, a tablet device, a wearable device (e.g., a smartwatch, fitness tracker, etc.), a smart speaker or other smart home device (e.g., a washing machine, a refrigerator, etc.), etc.

In addition, the mobile device 102 may also include a variety of applications installed thereon. For instance, the illustrated mobile device 102 includes an identity application 110, which is associated with and/or includes a digital identity repository 112. The identity application 110 includes executable instructions, which are stored in the mobile device 102 and, when executed, cause the mobile device 102 to operate as described herein. That said, the application 110 generally resides in an operating system (OS) application environment of the mobile device 102. And, the digital identity repository 112 is included in a memory of the mobile device 102, such as, for example, a trusted execution environment (TEE) or secure element (SE). As described further below, the digital identity repository 112 is generally compiled, through the identity application 110, to include digital identity attributes representative of the identity of the user 104.

The relying party 106 in the system 100 may include an entity, with which users (including the user 104) interact based, at least in part, on identities of the users. For example, the relying party 106 may include, without limitation, an employer offering employment to users; a merchant offering products and services for sale; an insurance provider offering health insurance, automobile insurance, home owners insurance, etc.; a financial institution (e.g., a bank, etc.) offering credit accounts, mortgage accounts, etc. to users; etc. It should be appreciated that the mobile device 102 may be configured to communicate with the relying party 106, as a separate entity (apart from the mobile device 102), directly or via an application associated with the relying party 106 and included in the mobile device 102, etc. For example, the mobile device 102 may be configured, by the identity application 110, to provide identity attributes to the relying party 106 (e.g., via wireless connection (e.g., by tapping the mobile device 102 at a terminal of the relying party 106, etc.), etc.), as described below. In another example, a banking application may further be installed in the mobile device 102, whereby the banking application (via a software development kit (SDK) included in the banking application, for example) interacts with the identity application 110 to receive identity attributes therefore, as described below, and for use in then communicating with the relying party 106 (where the relying party 106 may be a banking institution associated with the banking application).

With continued reference to FIG. 1, the sources 108 may include, for example, sources of data associated with the user 104, such as banking institutions, merchants, identity providers, etc. For instance, one of the sources 108 may include a banking institution, and the application 110 may configure the mobile device 102 to retrieve historical data related to transactions by the user 104 for an account issued by the banking institution to the user 104 (e.g., via an application programing interface (API) exposed by the banking institution, or a banking application associated with the banking institution and included in the mobile device 102, etc.). Further, another one of the sources 108 may include an airline merchant, and the application 110 may configure the mobile device 102 to retrieve (e.g., via an API exposed by the airline merchant, or an airline application associated with the airline merchant and included in the mobile device 102, etc.) flight details for flights purchased by the user 104 from the airline merchant. That said, it should be appreciated that the sources 108 may be various other sources of data for the user 104, in general and as described in more detail below (e.g., other applications or platforms or entities through which users purchase products, other applications or platforms or entities that identify locations of users at particular times, other applications or platforms or entities that identify schedules for users, etc.).

While only one mobile device 102, one user 104, one relying party 106, and two sources 108 are illustrated in the system 100, it should be appreciated that additional ones of these parts/users may be, and likely would be, included in other system embodiments. In connection therewith, the user 104 may not be associated with sources 108 in all embodiments, but may be associated with only one source, or with more than two sources. What's more, sources may overlap for different users in some embodiments, such that the same source may be applicable to multiple users.

Figure 2:
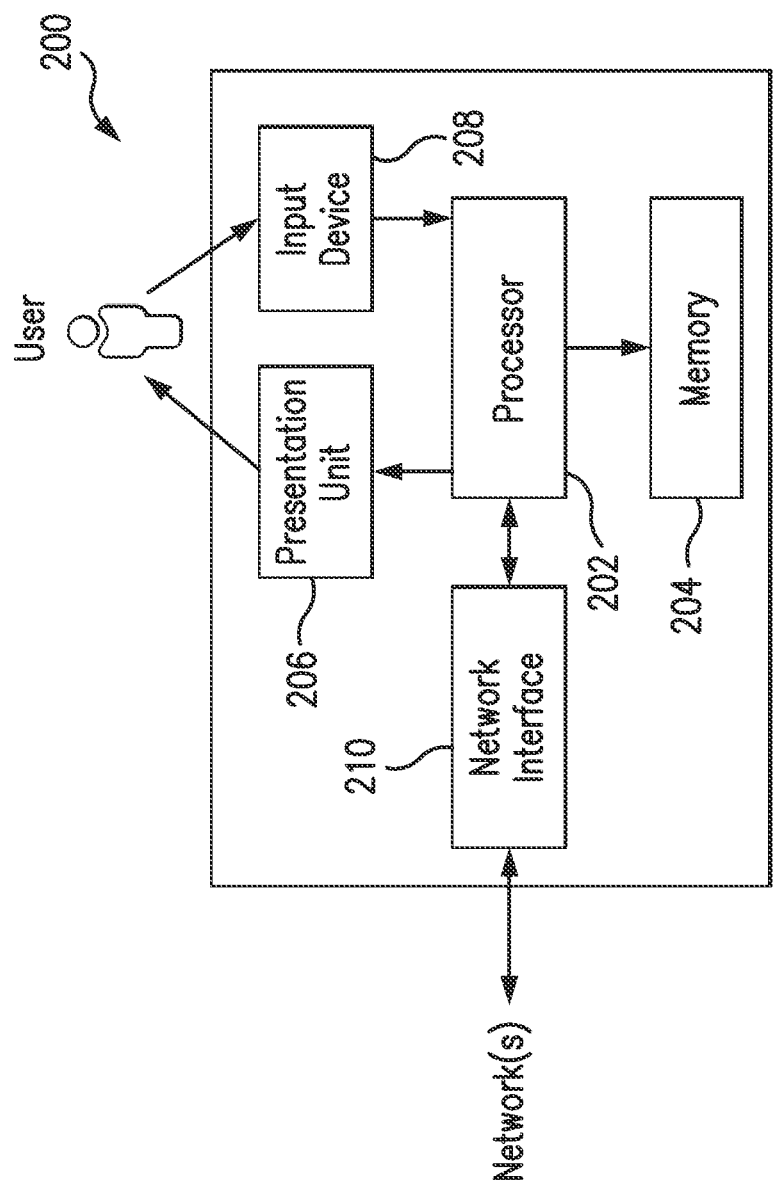
FIG. 2 is a block diagram of a computing device that may be used in the example system of FIG. 1.

FIG. 2 illustrates an example computing device 200 that can be used in the system 100 of FIG. 1. The computing device 200 may include, for example, one or more servers, workstations, personal computers, laptops, tablets, smartphones, virtual devices, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the mobile device 102, the relying party 106, and the sources 108 may include or may be implemented in a computing device consistent with the computing device 200 (coupled to (and in communication with) the one or more networks of the system 100). However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, listings of sources and data associated therewith, rules, preferences, historical data (including historical authentication data), behavior and intention data, authentication policies and/or other types of data (and/or data structures) suitable for use as described herein.

Furthermore, in various embodiments, computer-executable instructions (e.g., in the form of the mobile application 110 and/or an SDK therein, etc.) may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby upon performance of the same the computing device 200 may be transformed into a special purpose computer system. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., the user 104, etc.) (e.g., solicitations for permission to share data, etc.) whereby the information may be displayed at (or otherwise emitted from) computing device 200, and in particular at presentation unit 206. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user of the computing device 200 (i.e., user inputs) such as, for example, authentication inputs associated with permission, etc. as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), or other device capable of communicating to one or more different networks herein and/or with other devices described herein. Further, in some example embodiments, the computing device 200 may include the processor 202 and one or more network interfaces incorporated into or with the processor 202.

Referring again to FIG. 1, as indicated above, the user 104 is associated with personal identifying information (PII), which generally defines the identity of the user 104. In this example embodiment, the identity of the user, and attributes thereof (e.g., name, birthdate, address, phone number, gender, height, weight, government ID numbers, insurance information, membership identifiers, payment account credentials, etc.), is/are provisioned to the digital identity repository 112 in the mobile device 102. The identity may be provisioned, for example, via the identity application 110, through one or more physical documents such as, for example, a passport, credit cards, a driver's license, insurance cards, or other government or non-government issued documents/cards, etc.

The mobile device 102 is configured, then, by the identity application 110, to authenticate the user 104 in connection with access to and/or sharing of the PII included in the digital identity repository 112. The authentication may be via, for example, a biometric (e.g., a fingerprint, a facial image, etc.), a password, a PIN, a gesture, a one-time passcode, etc. presented to the mobile device 102. The biometric, passcode, PIN, gesture, etc. (broadly, authentication data) may be captured by the mobile device 102 when the PII is originally provisioned to the mobile device 102 in various manners (e.g., as a reference, etc.). For example, a facial image may be captured from the user 104 (e.g., subject to liveness detection, etc.), and then compared to the facial image included in an image of a passport captured by the mobile device 102. The facial image may then be used as a reference for subsequent authentication of the user 104 to access the PII. Also, in various embodiments, the authentication data may be provided from one or more of the sources 108. For example, a PIN associated with a bank account may be provided to the mobile device 102 based on the user 104 authenticating to an application (included in the mobile device 102) associated with a banking institution that provided the bank account. The PIN may then be used as a basis to authenticate the user 104 in connection with accessing the PII (either in connection with accessing the application associated with the banking institution (whereby the user 104 may then also access the digital identity repository 112) or as a separate authentication to the digital identity repository 112).

It should be appreciated that the authentication data, in this example embodiment, is stored in the digital identity repository 112, or potentially, in a trusted execution environment (TEE) or secure element (SE) in the mobile device 102.

In addition to the PII, the digital identity repository 112 further includes contexts (or context data) for the user 104. In this example embodiment, the contexts include, without limitation, preferences of the user 104, historical activities by the user 104, behaviors of the user 104, intentions and velocities for the user 104, etc. The preferences may include, for example, levels of authentication requested (or set) by the user 104 (or otherwise requested or required) based on information to be shared (e.g., relatively lower authentication to share age, relatively higher authentication to share government ID numbers, etc.), authentication type based on current location of the user 104 (e.g., relatively higher authentication outside of city of residence, or always require biometric authentication outside of country, etc.), etc. With regard to activity history, the digital identity repository 112 may include a listing and/or frequency of certain interactions performed by the user 104 and/or a listing and/or or frequency of regular interactions performed by the user 104 (e.g., checking a balance once a day, withdrawing money on Saturday evenings, sharing age and payment account credentials at the same merchant (e.g., a grocery store, etc.), etc.), etc. Example behaviors may include patterns of use of the mobile device 102 (as a proxy for the user 104) such as, for example, locations frequently visited by the user 104, routes frequently taken, wireless connections utilized (e.g., regular WIFI networks, Bluetooth connections, etc.), gait parameters when walking, types of music, etc. Further, intentions may include actions, activities, or interactions that the user 104 actively or passively indicates to be forthcoming, such as, for example, an intention to collect an item after purchasing the item online (or have the item delivered to a particular address), an intention to share passport information after booking an international flight, and an intention to purchase fuel or pay tolls after unlocking, starting, or renting a vehicle, etc. And finally, velocity may include a number of transactions (broadly interactions) in a given period of time (e.g., relative to an authentication or strong authentication, etc.), such as, for example, three transactions within a specific hour and/or after an event, ten transactions per day, etc. It should be appreciated that the above examples are provided for purposes of illustration only, and that other examples of contexts for the user 104 (or context data) should be understood to be within the scope of the present disclosure.

In connection therewith, the mobile device 102 may be configured, by the identity application 110, to solicit the contexts (e.g., the user preferences and other data associated with the contexts above, etc.) either from the user 104 or from the sources 108, etc. For example, the mobile device 102 may be configured to present an interface to the user 104, at the mobile device 102, to solicit preference(s) or other context data, either through entry by the user 104, selection among predetermined options, confirmation of default options, etc. What's more, the mobile device 102 may be configured, by the identity application 110, to interact with other applications included in the mobile device 102 and associated with one or more or the sources 108, or directly with the one or more of the sources 108, to retrieve data indicative of one or more of the above contexts, etc.

As, or after, the data is retrieved or received by the mobile device 102 (from the user 104, from one or more of the sources 108, etc.), the mobile device 102 is configured, by the identity application 110, to store the context data in the digital identity repository 112 in memory.

The mobile device 102 is then configured, by the identity application 110, to generate signals indicative of the contexts of the user 104 (referred to herein as context signals), based on the data and the specific preferences, activity histories, behaviors, intentions and velocities associated with the data, associated with the mobile device 102 and/or associated with the user 104, etc. In general, the context signals define a risk profile for the user 104 and provide an indication of what authentication may be allowed, used, required, etc. for a given interaction that implicates the context signals. With that said, it should be appreciated that the context signals may be generated in response to a trigger (e.g., a user authentication (e.g., via a PIN, a biometric, a gesture, a double click, etc.) or an attempted access of the digital identity repository 112, etc.) or they may be generated at one or more regular or irregular intervals.

The context signals are then stored, in the digital identity repository 112 in memory, as sets of machine-readable rules (e.g., if-then type case statements in machine syntax, etc.) that can be applied to interactions by the user 104 with relying parties (including the relying party 106). Examples of such rules may include (without limitation): when the mobile device 102 is connected to a known/regular WIFI network, reduce a level of authentication required for the user 104; when single factor authentication is required, prefer PIN authentication; when biometric authentication is requested, prefer voice authentication; etc. That said, the rules are generally singular in nature. However, the rules will often be implemented in combination, whereby multiple rules may be applicable to and/or utilized in a given interaction scenario. For instance, for an interaction by the user 104 with a particular relying party, the time of the interaction with the relying party must also match a designated timescale for which regular interactions with that relying party would be expected to occur (based on an identifier of the relying party) in order to reduce a level of authentication required for the user 104 in the interaction; for an interaction by the user 104 with a relying party in a specific category or grouping of relying parties (e.g., a financial sector category, etc.), strong authentication may be applied for the interaction based on the user's preference to always apply strong authentication for such category or grouping; for an interaction by the user 104 with a relying party at a particular location (e.g., at an airport, etc.) involving a particular attribute or set of attributes that is/are expected to be shared at the location at a given timescale, a reduced a level of authentication may be allowed; for an interaction by the user 104 with a relying party where the user's mobile device 102 is connected to a known/regular WIFI network (e.g., a home WIFI network, etc.) and the user 104 has used a recognized typing cadence to interact with the relying party, reduced authentication may be allowed; etc.

With that said, the user 104 may attempt to share information with the relying party 106 (as retrieved and stored above), through the mobile device 102, and specifically, the digital identity repository 112 as part of an interaction with the relying party 106 (e.g., certain PII for opening a new account with the relying party 106, payment account credentials for a transaction with the relying party 106, etc.). In doing so, the user 104 opens the identity application 110 and then taps (or otherwise presents) the mobile device 102 at a terminal of the relying party 106, or alternatively, by requesting one or more operations in a relying party application in the mobile device 102 (e.g., open a new account, purchase a product, etc.). Regardless, the relying party 106 (whether directly, or via the application) is configured to provide a request to the mobile device 102, which includes a description of one or more identity attributes requested for the user 104 based on the interaction, the relying party's name and location, a type of the interaction (e.g., purchase, balance check, attribute verification, etc.), a value of the interaction (e.g., a transaction amount, etc.), and a relying party policy. The relying party policy, in general, defines the type or level of authentication required, or requested, for the specific one or more identity attributes requested, along with any specific rules the relying party desires to implement in general for particular interactions. For example, the relying party policy may require a biometric authentication for a primary account number (PAN), or only a passcode for a driver's license number or date of birth, etc.

Upon receipt of the relying party request for information and policy, the mobile device 102 is configured, by the application 110, to determine a type of authentication required to provide the requested information to the relying party 106, based on the details of the request (including the relying party policy) from the relying party 106, the underlying interaction, and the generated context signals for the contexts stored in the mobile device 102 (as implicated by the given interaction). The relying party policy may include a set of machine-readable rules to be applied by the mobile device 102. Example rules associated with the relying party policy may include: authentication level 2 under NIST-800-63 standard; biometric authentication required; liveness check required; user preference override not allowed; user authentication within last 5 minutes. In connection therewith, then, the mobile device 102 is configured to apply the relying party policy in combination with the context signals from the digital identity repository 112 to ultimately determine the appropriate authentication to apply. In particular, the mobile device 102 is configured to apply the context signals to the interaction in view of the relying party policy and determine how the relying party policy can be satisfied, and then presents the required authentication to the user 104 for the interaction. It should be appreciated that the more conditions required (or the more strict conditions required) by the relying party policy, the more strict the authentication will be for the user 104 (despite the availability of less strict authorization by the context signals). However, the context signals are still evaluated in order to determine a balance in required authentication between the relying party policy and the context signals. In other words, the context signals allow for the authentication strength required by the relying party policy to be met in a greater variety of ways (e.g., where the relying party policy allows the user 104 to override the relying party policy required authentication at their own risk (e.g., the relying party policy may request two-factor authentication but the user 104 could set a preference with that relying party not to ask for any further authentication, etc.), etc.).

When the type of authentication required is determined, the mobile device 102 is configured, by the identity application 110, to solicit the authentication from the user 104, and the user 104 responds with the solicited authentication. When the user's response (e.g., passcode, biometric, gesture, etc.) is proper, the mobile device 102 may be configured, by the identity application 110, to further solicit consent to share the specified attribute(s) with the relying party 106, and the user 104 responds with consent. Thereafter, the mobile device 102 is configured, by the identity application 110, to share the requested attributes with the relying party 106 (e.g., in an encrypted manner to thereby provide the relying party 106 assurance in the attributes being received and to provide the user 104 assurance that the attributes are being shared with the correct party, etc.). The relying party 106 is then permitted to proceed in interacting with the user 104, whether to complete a purchase, set up a new account, etc., utilizing the attributes. The mobile device 102 may further be configured to update the context signals, as described above, as the user 104 is again authenticated to the mobile device 102.

Figure 3:
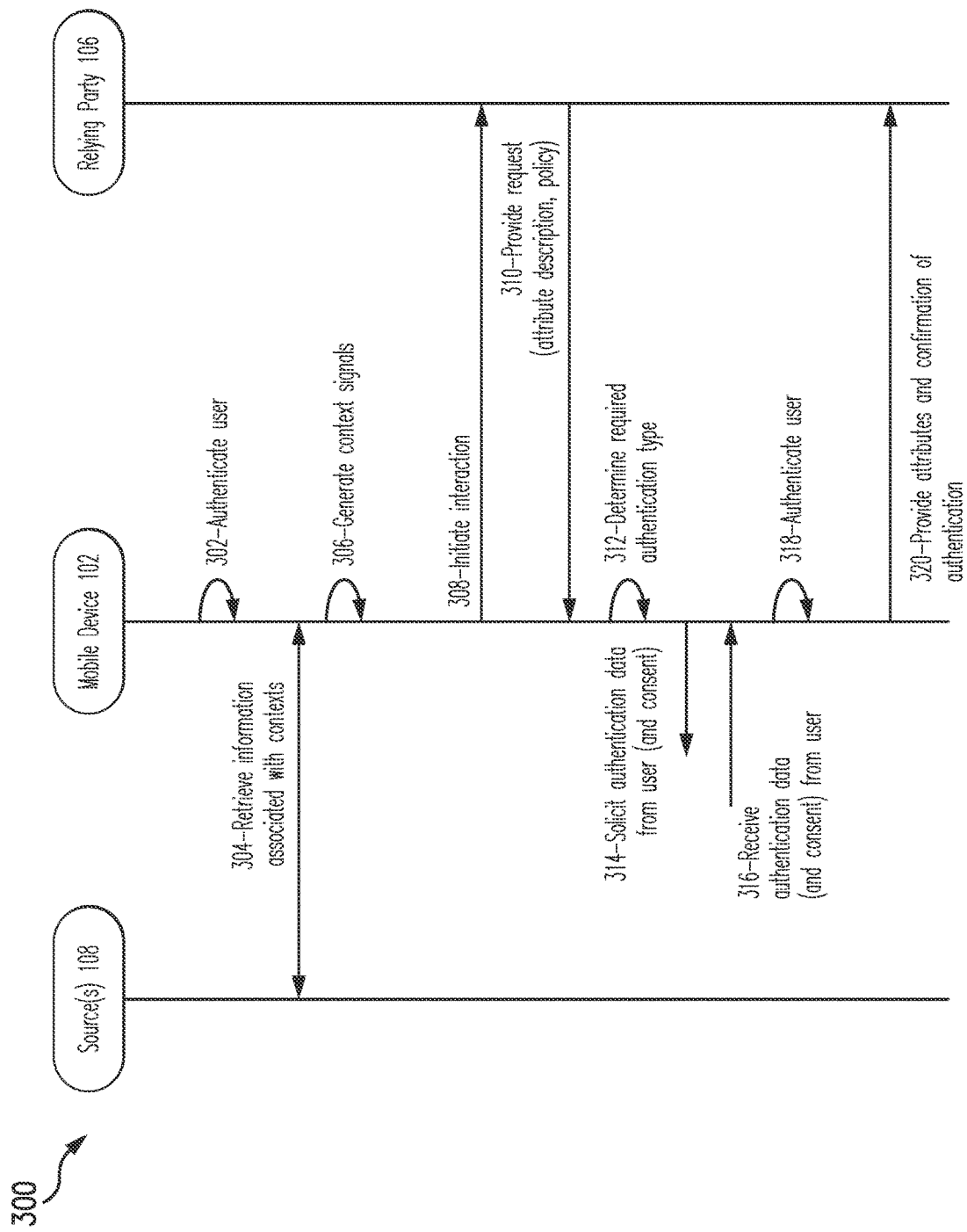
FIG. 3 is an example method, which may be implemented in connection with the system of FIG. 1, for use in determining a type of authentication to implement for a user for a given interaction based on associated context for the user.

FIG. 3 illustrates an example method 300 for use in determining a type of authentication of a user for a given interaction based on associated context. The example method 300 is described as implemented in the mobile device 102 and other aspects of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

At the outset in the method 300, it should be appreciated that the mobile device 102, as described above, includes the identity application 110 and the digital identity repository 112, which includes various attributes of the identity of the user 104 (e.g., PII, etc.). The attributes may be provisioned thereto, in any suitable manner. What's more, the mobile device 102 includes authentication data (e.g., reference data, etc.) suitable for authenticating the user 104 through different types of authentication (e.g., biometric, passcode, gesture, etc.). And, finally, the mobile device 102 includes various preferences and/or rules associated with context of the user 104 and/or the mobile device 102 and/or prior interactions related thereto.

At 302, the user 104 is authenticated at the mobile device 102, and specifically, to the identity application 110. The authentication may be in connection with accessing the identity application 110, or with accessing another application at the mobile device 102, or with accessing the mobile device 102 in general. The authentication may be of any suitable type, including biometric (with or without liveness check) (registered or as compared to a physical document), access to the mobile device 102 (e.g., access via the OS lock mechanisms, etc.), a PIN, a passcode/password, a gesture, a one-time passcode (OTP) (e.g., an OTP transmitted to the mobile device 102 via a SMS text message (e.g., via a cloud service provided by an entity associated with or offering the identity application 110, etc.), an OTP obtained through a suitable authentication application installed at the mobile device 102 (e.g., Google® Authenticator, etc.), an out-of-bank OTP such as a RSA token, etc.), a double-click at the mobile device 102, etc. In at least one embodiment, the user 104 is authenticated based on mere possession of the mobile device, whereby use of the mobile device 102 constitutes an authentication of the user 104.

In response to the authentication, in this example, the mobile device retrieves, at 304, from one or more of the sources 108, information associated with the user 104 and/or the mobile device 102, which is indicative of one or more contexts. The information may include, for example, transaction and inquiry data for an interval (e.g., the last five days, all data since a prior retrieval, etc.) (e.g., transactions, balance check, withdrawals, etc.), from a bank institution, etc. (as a source 108). The information may also include, for example, gathered and/or historical data from a fitness application included in the mobile device 102 (e.g., including gait data for the prior interval, etc.), or from a maps or location application included in the mobile device 102 (e.g., including route history, locations, etc.), or from a music application included in the mobile device 102 (e.g., indicating type of music, frequency of specific songs, etc.), etc. Further, the information may include operations of the mobile device 102 (e.g., repeatedly connected WIFI networks, Bluetooth activity, etc.), or travel purchases from a banking source or a travel merchant source, or the information may be indicative of device interaction(s) (e.g., access to a vehicle application (e.g., started a vehicle, traveled a defined distance, etc.), or an appliance application (e.g., number of wash cycle (e.g., dishwasher, washing machine, etc.), etc.). It should be appreciated that while the above-referenced applications may be included in the mobile device 102, each is still considered a source 108 (itself or where the source is a backend for the application).

Thereafter in the method 300, the mobile device 102 (as configured by the identity application 110) generates, at 306, context signals for the user 104, the mobile device 102, etc. based on the retrieved information. And, the context signals are then stored in the digital identity repository 112 included in the mobile device 102. In general, and as described above in the system 100, the context signals are indicative of one or more patterns of the user 104 and/or the mobile device 102 (based on history data about any of the user's account(s), the digital identity repository 112, the mobile device 102, etc.). In connection therewith, the context signals, again, are sets of machine-readable rules that can be applied to interactions by the user 104 with relying parties (including the relying party 106) in view of the relying parties' authentication policies.

While user authentication, at 302, initiates the steps to generate the context signals (at 306), it should be appreciated that other activities, or time intervals (regular or irregular), may cause the context signals to be generated (and/or updated). As such, the context signals may be available, and accurate, for use as described below. That said, in certain embodiments, the context signals may be generated in connection with a relying party request for identity attributes, and/or the context signals may be generated at defined intervals (or at random intervals), etc.

Next in the method 300, the user 104 initiates, at 308, an interaction with the relying party 106 (either separate from the mobile device 102, or through an application included therein), or vice versa.

In response, at 310, the relying party 106 provides a request to the mobile device 102 with regard to the interaction. The request includes, without limitation, a description of the identity attributes required for the interaction with the user 104 (e.g., government ID number, birthdate, age, mailing address, PAN, etc.) and/or an assertion by the user 104 (to be validated), and a relying party policy. As indicated above, the relying party policy may indicate a required type or level of authentication of the user 104 whereby the relying party 106 will rely on the identity attributes provided in connection with the interaction. For example, where a relying party policy specifically requires biometric authentication (without an ability of the user 104 to override the requirement), and the identity attributes are provided along with indication of a PIN authentication of the user 104 (e.g., based on context signals, etc.), the relying party 106 may opt to decline the identity attributes as insufficiently proven (or authenticated). Or, if a relying party policy requires biometric authentication (with an ability of the user to override the requirement), and the identity attributes are provided along with indication of a PIN authentication of the user 104 (e.g., again based on context signals, etc.), the relying party 106 may notify the user 104 (e.g., at the mobile device 102, etc.) that biometric authentication is required and request the user 104 to confirm to opt out of biometric authentication (e.g., Biometric Authentication: Y/N?, etc.). Alternatively, in such interactions where the relying party policy provides the user 104 an option to opt out of the specified authentication, the user 104 may have a preference set to automatically opt out of such specified authentication in certain instances (e.g., for transactions less than a specified amount, for interactions occurring consistent with another context signal, for requests involving specified attributes, etc.), such that the mobile device 102 automatically responds to any confirmation requests from the relying party 106 in such instances based on the user's preference.

The request from the relying party 106 may further include an identity of the relying party 106, a location of the relying party 106, a type of use case being undertaken (e.g., a purchase transaction, a balance inquiry, an age verification, etc.), and a value associated with the interaction (e.g., a purchase amount, etc.).

Upon receipt of the request, the mobile device 102 determines, at 312, a required type of authentication for the interaction. In particular, the mobile device 102 (as configured by the identity application 110) retrieves the context signals, and the other context data, such as, for example, the preferences of the user 104, and determines based on the context of the interaction (and the data included in the request for the interaction (e.g., transaction amount, relying party policy, relying party name or location, etc.), whether a biometric type of authentication is required, or whether a PIN, passcode, gesture, etc., type of authentication would be sufficient.

As described above in the system 100, the mobile device 102 applies the context signals to the interaction in view of the relying party policy and determines how the relying party policy can be satisfied (e.g., does the relying party policy allow for the user 104 to override a higher authentication, does the relying party policy allow for different types of biometric authentication to be used, etc.), and then presents the required authentication to the user 104 for the interaction. In other words, the mobile device 102 (by way of the identity application 110) operates to select an appropriate authentication type for a given interaction, based on the context signals implicated for the interaction, and with an underlying purpose of still meeting the relying party policy in force for the interaction. As such, the context signals are applied in view of the constraints of the relying party policy (e.g., the mobile device 102 may determine that less authentication is required for a given interaction, than specified in a relying party policy, provided the relying party policy does not prohibit use of such less authentication; etc.).

In connection therewith, authentication required by relying party policies may utilize (or rely on) active factors such as knowledge, possession, and biometric (e.g., where two of the three factors are required to be used, etc.) and passive factors such as behavioral biometrics and device profiling. By adding context (in the form of the context signals in the present disclosure), the passive factors may be strengthened (based on their context in the underlying interaction) to give them equivalent strength and status as the active factors. In addition, the context signals generated herein can provide preference as to which of the active factors is used, and which type of the given factors is used, dependent on the situation. For example, when biometric authentication is required (as an active factor by the relying party policy), the user 104 may prefer (as a context signal) a voice biometric when at home, whereas the user 104 may prefer a fingerprint biometric when the user's mobile device 102 is connected to a public WIFI network (e.g., on a train, etc.). Or, when biometric authentication is required (as an active factor by the relying party policy), the user 104 may instead prefer (as a context signal) to use a lower strength PIN authentication when the user's mobile device 102 is connected to a home WIFI network (where such lower authentication is accepted under the given relying party policy, etc.).

For example, the context signal(s) may indicate that the user 104 has recently renewed their passport (e.g., a newly issued passport was added to the digital identity repository 112, etc.) (or even just added a passport to the digital identity repository 112 in the mobile device 102) (broadly, an activity history context), and also purchased a flight to a foreign country (e.g., based on transaction history associated with a credit card, etc.) (broadly, an intention context), etc. As such, when a currency exchange entity (e.g., a bank, etc.) requests an account credential, the mobile device 102 (as configured by the identity application 110) determines that the currency conversion makes sense in the context and determines to accept a PIN authentication, while the currency conversion taken out of context of the passport addition and the flight purchase would have required a biometric authentication (where the relying party policy allows the user to override the biometric authentication requirement).

Further, in connection with the above example, it is clear that the mobile device 102, as holder of the digital identity of the user 104, is informed of the three interactions (and relies on the context of the form of the interactions to determine a type of authentication in the later one of the interactions), yet the passport agency, the merchant airline, and the currency conversion entity are not. The privacy of the user 104, in the above example, is thus preserved.

In another example, the context signal may indicate that the user 104 makes weekly purchases at Grocery Store, on Saturday between 9 AM and 11 AM (e.g., based on a transaction history associated with a credit card, etc.) (broadly, an activity history context), etc. As such, the user 104 may be permitted (e.g., based on a user preference, etc.) to authenticate merely by possessing the mobile device 102 at the Grocery Store on Saturday between 9 AM and 11 AM, whereby the user 104 is permitted to provide a credit card credential without any further authentication at the mobile device because the context is considered in evaluating the interaction (while the purchase taken out of context would have required at least a password or PIN along with presentation of a credit card) (and, again, where the relying party policy allows the user to override the biometric authentication requirement).

Then in the method 300, when the type of authentication is determined, the mobile device 102 solicits, at 314, from the user 104, authentication data consistent with the determined type. For example, the mobile device 102 may request the user 104 to provide a fingerprint, or take a facial image, or to perform a gesture with the mobile device 102, etc. In turn, the mobile device 102 (at the same time or later) may solicit consent to share one or more specific attributes of the user's identity with the relying party 106. For example, the solicitation of consent may include "OK to share date of birth with ABC Company?," etc. In response, at 316, the user 104 provides the authentication data (and potentially, the consent) to the mobile device 102.

The mobile device 102 authenticates, at 318, the user 104 based on the authentication data (as compared to one or more references included in the digital identity repository 112 (e.g., in the TEE or DE of the mobile device 102, etc.)), and confirms any requested, required, etc. consent of the user 104 relating to the request by the relying party 106.

The mobile device 102 (as configured by the identity application 110) then provides, at 320, the requested attributes of the identity of the user 104 to the relying party 106, along with an indication of the authentication employed in order to provide the attributes (e.g., in an encrypted manner to thereby provide the relying party 106 assurance in the attributes being received and to provide the user 104 assurance that the attributes are being shared with the correct party, etc.). Not only the encryption, but the reputation of the publisher/sponsor of the application 110 and/or the digital identity repository 112 and the retention of attributes in the TEE, for example, may also provide assurances to the relying party 106. The mobile device 102 may further retrieve information from one or more of the sources 108 and/or applications in the mobile device 102 and update the context signals, as described above, as the user 104 is again authenticated to the mobile device 102.

In view of the above, the systems and methods herein provide for granularity in the type of authentication employed in connection with providing attributes of a digital identity (e.g., government ID numbers, payment credentials, etc.) based on context. That said, it should be appreciated that authentication of a user, especially repeated authentication of a user, may create friction between the user and relying parties (and which provides context for the repeated authentication). Often, a relying party may default to a stronger authentication when a weaker form of authentication or a more convenient form of authentication may provide the same or sufficient confidence, when considering the context of the user's interaction with the relying party, the mobile device or the interaction itself. As such, by determining a required type of authentication (rather than a default type of authentication), which is impacted by the context surrounding the authentication (e.g., the user's prior authentication for other interactions, etc.), the systems and methods herein may omit certain authentications, reduce friction associated with the authentications, reduce network traffic related to the authentication, and promote use of sufficient/suitable authentication (e.g., taking into account the relying party's authentication policy, etc.). In doing so herein, the desired authentication is actually determined for the given interaction, and not simply based on a default, static form of authentication.

What's more, in making such determination, not only is more convenient and/or appropriate form of authentication employed, but fewer failed authentications occur because of the unique interaction between the mobile device and the relying party (and application of the relying party's given authentication policy). And, the fewer failed authentications further result in reduced network traffic in the sense that the failed authentications do not need to be retried. What's more, the reliance on the mobile device for the attributes of the identity provide for a de-centralized identity solution, where the user is the holder of their own data and the privacy of the user is thus preserved (and not tracked by the relying party or an identity provider, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a mobile device, from a relying party, a request for an attribute of a user associated with the mobile device in connection with an interaction between the user and the relying party, the request including data indicative of the relying party and an authentication policy of the relying party; (b) determining, by the mobile device, a type of authentication, from among multiple types of authentication available at the mobile device, to be used for said interaction with the relying party, based on the authentication policy of the relying party and at least one of multiple context signals stored in the mobile device, prior to providing the attribute to the relying party, the multiple context signals indicative of one or more patterns indicative of the user and/or the mobile device based, at least in part, on historical authentication data; (c) soliciting, by the mobile device, authentication data from the user consistent with the determined type of authentication; (d) receiving, by the mobile device, the solicited authentication from the user; and (e) in response to the user being authenticated at the mobile device based on the authentication data, providing the attribute to the relying party, whereby the type of authentication is specific to the relying party and/or the multiple context signals, and not based on a default type of authentication.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in determining a type of authentication of a user for a given interaction based on associated context for the user and/or the interaction, the method comprising:

receiving, at a mobile device, from a relying party, a request for an attribute of a user associated with the mobile device in connection with an interaction between the user and the relying party, the request including data indicative of the relying party and an authentication policy of the relying party;

determining, by the mobile device, a type of authentication, from among multiple types of authentication available at the mobile device, to be used for said interaction between the user and the relying party, based on the authentication policy of the relying party and at least one of multiple context signals stored in the mobile device, prior to providing the attribute to the relying party, the multiple context signals indicative of one or more patterns of the user and/or the mobile device based, at least in part, on historical authentication data;

soliciting, by the mobile device, authentication data from the user consistent with the determined type of authentication;

receiving, by the mobile device, the solicited authentication from the user; and in response to the user being authenticated at the mobile device based on the authentication data, providing the attribute to the relying party, whereby the determined type of authentication is specific to the relying party and/or the multiple context signals, and not based on a default type of authentication.

2. The computer-implemented method of claim 1, further comprising authenticating the user, prior to receiving the request, and generating the context signals based on historical activities represented by the historical authentication data and included in at least one account issued to the user.

3. The computer-implemented method of claim 2, wherein the context signals are indicative of multiple of: a user preference for the user, a prior route by the mobile device, and/or an intention of the user based on a prior purchase.

4. The computer-implemented method of claim 1, wherein the multiple types of authentication available at the mobile device include biometric authentication, static password authentication, and dynamic passcode authentication.

5. The computer-implemented method of claim 1, wherein determining the type of authentication includes determining the type of authentication for the interaction to be a specific type of biometric authentication.

6. The computer-implemented method of claim 1, further comprising updating the context signals after providing the attribute to the relying party.

7. The computer-implemented method of claim 1, wherein providing the attribute to the relying party further includes indicating the determined type of authentication.

8. The computer-implemented method of claim 1, further comprising soliciting, by the mobile device, consent from the user to share the attribute with the relying party; and
wherein providing the attribute to the relying party includes providing the attribute further in response to consent from the user to share the attribute with the relying party.

9. A non-transitory computer-readable storage medium comprising executable instructions for use in determining a type of authentication for an interaction, which when executed by at least one processor of a computing device of a user, cause the at least one processor to:
receive, from a relying party, a request for an attribute of a user in connection with an interaction between the user and the relying party, the request including data indicative of the relying party and an authentication policy of the relying party;
determine a type of authentication, from among multiple types of authentication available at the computing device, to be used for said interaction between the user and the relying party, based on the authentication policy of the relying party and at least one of multiple context signals stored in memory in communication with the computing device, prior to providing the attribute to the relying party, the multiple context signals indicative of one or more patterns of the user and/or the computing device based, at least in part, on historical data;
solicit authentication data from the user consistent with the determined type of authentication;
receive the solicited authentication from the user; and
in response to the user being authenticated, provide the attribute to the relying party, whereby the determined type of authentication is specific to the relying party and/or the multiple context signals, and not based on a default type of authentication.

10. The non-transitory computer-readable storage medium of claim 9, wherein the executable instructions, when executed by the at least one processor, further cause the at least one processor to authenticate the user, prior to receiving the request, and generate the context signals based on historical activities represented by the historical data and included in at least one account issued to the user.

11. The non-transitory computer-readable storage medium of claim 10, wherein the executable instructions, when executed by the at least one processor, further cause the at least one processor to solicit consent from the user to share the attribute with the relying party; and
wherein the executable instructions, when executed by the at least one processor to provide the attribute to the relying party, cause the at least one processor to provide the attribute in response to consent from the user to share the attribute with the relying party.

12. The non-transitory computer-readable storage medium of claim 11, wherein the context signals are indicative of multiple of: a user preference for the user, a prior route by the mobile device, and/or an intention of the user based on a prior purchase.

13. The non-transitory computer-readable storage medium of claim 11, wherein the multiple types of authentication available at the mobile device include biometric authentication, static password authentication, and dynamic passcode authentication.

14. The non-transitory computer-readable storage medium of claim 11, wherein the executable instructions, when executed by the at least one processor, further cause the at least one processor to update the context signals after providing the attribute to the relying party.

15. The non-transitory computer-readable storage medium of claim 11, wherein the executable instructions, when executed by the at least one processor to provide the attribute to the relying party, cause the at least one processor to indicate the determined type of authentication.

16. A system for use in determining a type of authentication for an interaction between a user and a relying party, the system comprising:
a communication device associated with the user; and
a memory including: (i) multiple types of authentication available for authenticating the user in the interaction between the user and the relying party and (ii) multiple context signals indicative of one or more patterns of the user and/or the communication device based, at least in part, on historical data;
wherein the communication device includes at least one processor in communication with the memory, the at least one processor configured to:
receive, from the relying party, a request for an attribute of the user in connection with the interaction between the user and the relying party, the request including data indicative of the relying party and an authentication policy of the relying party;
determine a type of authentication, from the multiple types of authentication available in the memory, to be used for said interaction between the user and the relying party, based on the authentication policy of the relying party and at least one of the multiple context signals stored in the memory, prior to providing the attribute to the relying party;
solicit authentication data from the user consistent with the determined type of authentication;
receive the solicited authentication from the user; and
in response to the user being authenticated at the communication device based on the authentication data, provide the attribute to the relying party, whereby the determined type of authentication is specific to the relying party and/or the multiple context signals, and not based on a default type of authentication.

17. The system of claim 16, wherein the at least one processor is further configured to authenticate the user, prior to receiving the request, and generate the context signals based on historical activities represented by the historical data and included in at least one account issued to the user.

18. The system of claim 17, wherein the at least one processor is further configured to solicit consent from the user to share the attribute with the relying party; and
wherein the at least one processor is configured, in order to provide the attribute to the relying party, to provide the attribute in response to consent from the user to share the attribute with the relying party.

19. The system of claim 18, wherein the at least one processor is further configured to update the context signals after providing the attribute to the relying party.

20. The system of claim 16, wherein the memory is disposed in the communication device.

* * * * *